June 8, 1965   P. G. SPEARS   3,187,809
HEAT-EXCHANGE ROLL AND METHOD OF MAKING
Filed Jan. 11, 1963   2 Sheets-Sheet 1

INVENTOR.
PAUL G. SPEARS
BY
*Imirie and Smiley*
ATTORNEYS.

INVENTOR.
PAUL G. SPEARS
BY
ATTORNEYS.

United States Patent Office 3,187,809
Patented June 8, 1965

3,187,809
HEAT-EXCHANGE ROLL AND METHOD OF MAKING
Paul G. Spears, Richmond, Va., assignor to The Inta-Roto Machine Company, Inc., Richmond, Va., a corporation of Virginia
Filed Jan. 11, 1963, Ser. No. 250,921
3 Claims. (Cl. 165—90)

This invention relates to heat-exchange rolls for either heating or cooling webs or sheet materials or for other such purposes, and more particularly to such rolls wherein their cylindrical surfaces are acted upon by a fluid heat-exchange medium.

Drier rolls are used to heat webs of paper and other materials as they pass over the rolls, in order to dry ink on the paper, for example, or for other purposes of heat treatment. The rolls should be heated uniformly across their heating surfaces so that they will impart heat uniformly to the webs passing around them, and that has long presented a difficult problem where a heated fluid is circulated through the interior of the roll for purposes of supplying the necessary heat. Alternatively, cooling rolls are similarly employed, for example, to set the adhesive in laminated sheets and here also it is desirable that the cylindrical heat-exchange or cooling surfaces have a substantially uniform temperature across their width.

Heat-exchange rolls usually comprise a cylindrical metal shell that forms the working surface of the roll and passage forming means on the inner surface of the shell for the flow of a heat-exchange medium therethrough. The passage forming means may comprise pipes which have the disadvantage of limited heat transfer to the shell, or such means may comprise an inner shell concentrically spaced within the outer shell and webs extending between such shells and forming the passages. In the latter structure, the webs usually are welded on the inner shell and the outer shell is shrunk onto the webs. In any event, the webs can be sealingly secured only to one of the shells, the seal with the other shell being obtained by a tight fit but this latter is very difficult to obtain.

Having in mind the defects of the prior art apparatus, it is the principal object of the present invention to provide a heat-exchange roll having means for controlling the temperature of the heat-exchange surface throughout its area.

It is another object of the invention to provide a heat-exchange roll having sealed passages for the heat-exchange medium and high heat-exchange characteristics.

A further object of the invention is to provide an improved method for fabricating a heat-exchange roll.

Still another object of the invention is to provide a heat-exchange roll having simplicity of design, economy of construction and efficiency in operation.

Briefly, the present invention resides in so arranging the circulation paths of the fluid heat-exchange medium that it will improve control and/or uniformly of temperature distribution across the working surfaces of the roll. The invention utilizes multiple streams of fluid moving in opposite rotational directions around the roll, which offsets any interference by the moving fluid with the rotation of the roll. The roll comprises a cylinder formed by a pair of coiled tubes of square or rectangular section welded together with the outer periphery of the coiled tubes finished to constitute the working surface of the roll. One wall of the tubes may be thicker and form the outer peripheral wall of the cylinder and a single tube having a longitudinal partition subdividing the tube into a plurality of passages may be used instead of the pair of tubes.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

Figure 1:
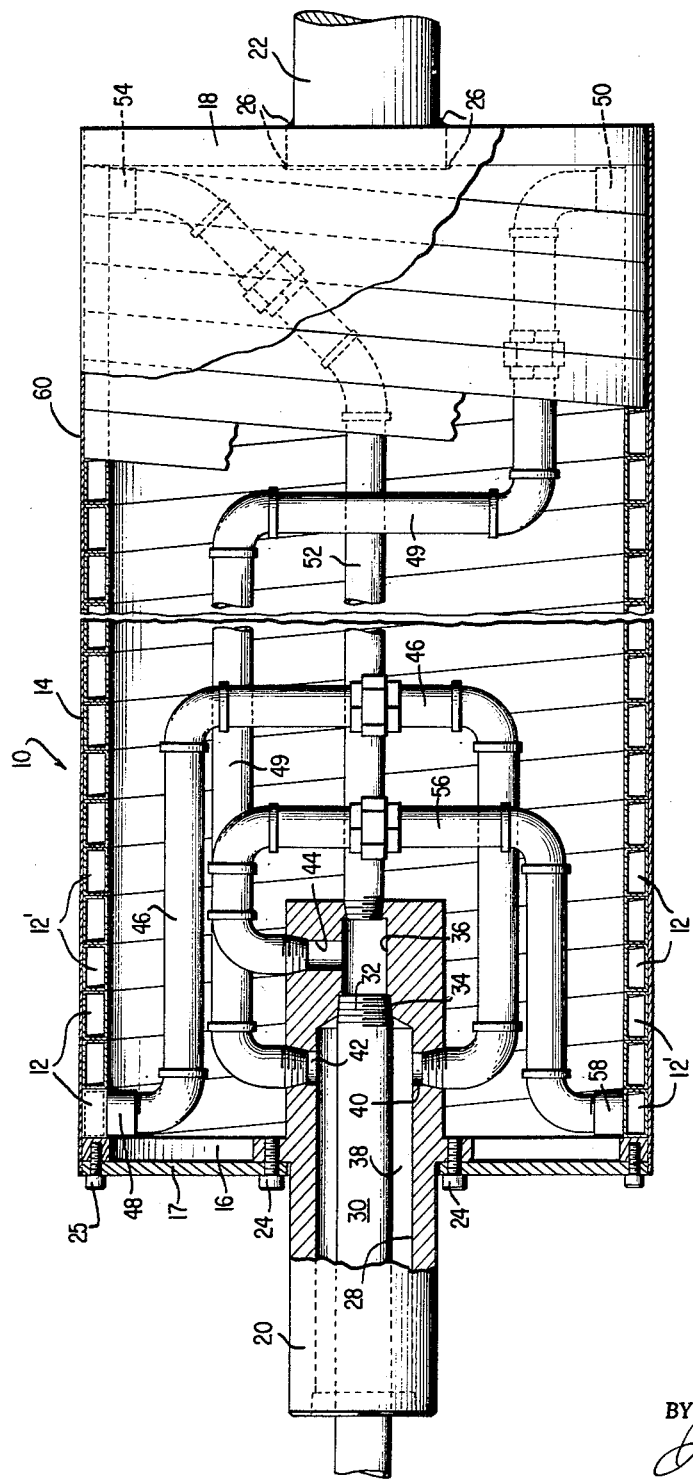
FIG. 1 is an elevational cross sectional view taken axially of a drier roll in accordance with the present invention illustrating the header connections for directing a heat-exchange medium in helically oppositely directed rotational paths.

Referring now more particularly to the drawing, and specifically to FIG. 1, a rotatable heat-exchange roll in accordance with the present invention comprises a cylinder 10 constituted by at least one pair of coiled tubes 12, 12' of square or rectangular section with the outer peripheral surface 14 of the coil forming the working surface of the roll. The ends of the cylinder 10 are supported and may be closed by end rings and or plates 16 and 18 welded thereto and which are mounted on axles 20 and 22, respectively. Preferably, the axle 20 is removably secured to an end plate 17 as by bolts 24, said plate 17 also being removably secured to the end ring 16 as by bolts 25, removal of the end plate 17 permitting access to the interior of the cylinder. The axle 22 may be fixed to the end plate 18 by welds 26 or the like.

The axle 20 is of tubular form and has a hollow portion 28 extending from the outer end thereof to a point short of the inner end. A tube 30 is positioned within the hollow portion 28 and has a screw threaded end 32 engaged within a screw threaded counterbore 34 in the inner end portion of the axle. In communication with the counterbore 34 is a further counterbore 36 extending through the inner end of the axle. The tube 30 is of smaller diameter than the hollow portion 28 providing an annular passage 38 therebetween and at the inner end of the annular passage 38, the axle is provided with two radially extending bores 40 and 42 and adjacent the inner end, the axle is also provided with a radial bore 44 in communication with the counterbore 36. For purposes of description, the annular passage 38 will be considered as an inlet passage, whereas the tube 30 will be considered as an outlet passage.

Within the roll, a header 46, which may be formed of standard pipe sections, is connected at one end to the axle 20 in communication with the radial bore 40 for communication with the annular inlet passage 38; and at its other end, the header is connected with an inlet 48 at one end of the coiled tube 12. A second header 49 is connected with the axle 20 in communication with the radial bore 42 for communication with the annular inlet passage 38, and this header 49 extends longitudinally through the roll and is connected with an inlet 50 at one end of the coiled tube 12'. A further header 52 extends between the counterbore 36 in the inner end of the axle 20 and an outlet 54 at the other end of the coiled tube 12, and which is located at the other end of the roll. Finally, a fourth header 56 is connected with the axle 20 in communication with the radial bore 44 and is connected with an outlet 58 at the opposite end of the coiled tube 12'.

The coiled tubes 12, 12' comprise two continuous helically disposed tubes of square or rectangular cross section with the helices of one tube interposed between the helices of the other tube and it will be apparent from the foregoing description that the heat-exchange medium is supplied to one of the tubes at one end of the roll and to the other tube at the other end of the roll so that fresh heat-exchange medium is supplied to the roll at both ends thereof. The tubes 12, 12' are positioned in side-by-side alternately disposed relationship and are in heat exchange relation so that their temperatures are modified by each other.

The annularly continuous helically disposed tubes 12, 12' preferably are fabricated of close coiled square or rectangular steel tubing. Two lengths of such tubing are welded together side-by-side and then rolled to form a double spiral coil with the adjacent side walls of adjacent coils in engagement. After coiling, the adjacent walls of the double spiral coils are welded all around between the coils to form a uniform roll surface with the outer peripheries of the coils disposed to form a true, that is, smooth surface. The ends of the cylinder so formed are cut or otherwise formed on planes perpendicular to the cylinder axis.

Figure 3:
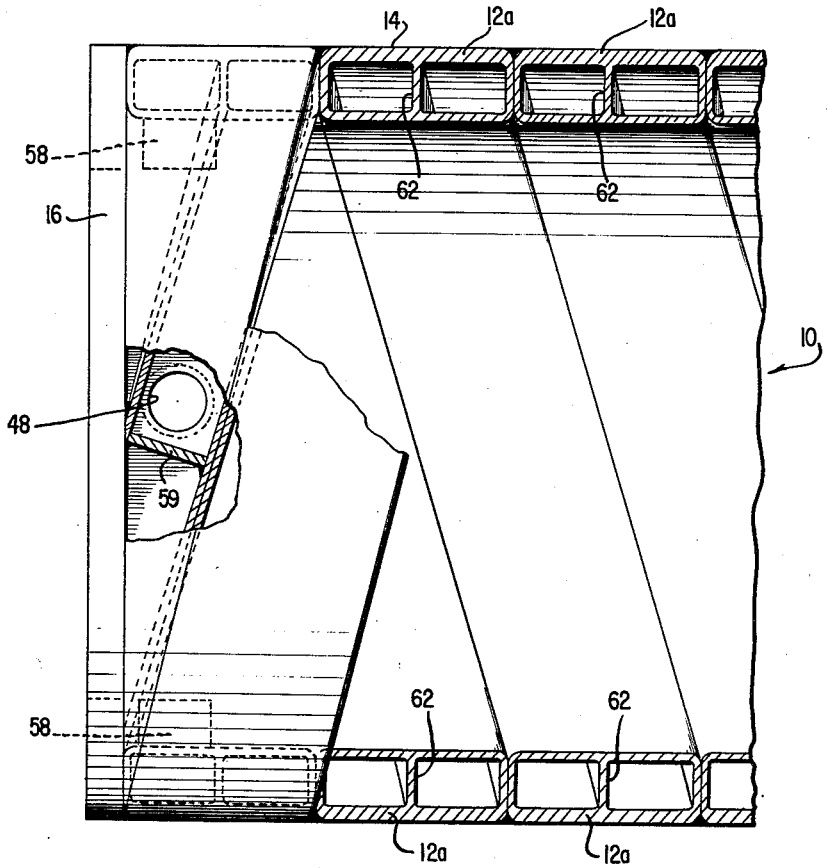
FIG. 3 is a fragmentary elevational cross-sectional view of a modification.
Figure 4:
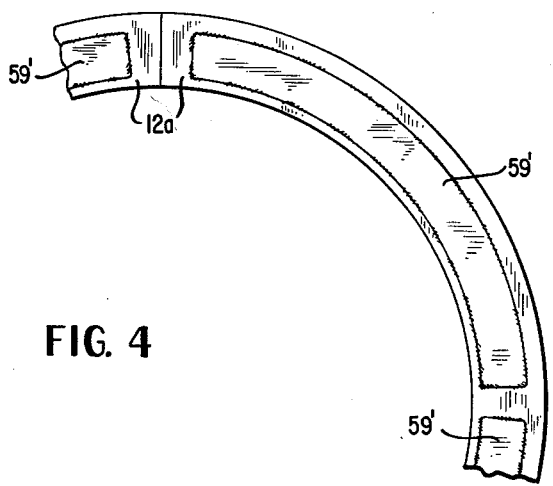
FIG. 4 is a fragmentary view in elevation of the end of the roll cylinder and illustrating a modification of FIG. 3.

The ends of the tubes are sealed either by welding the end plates 16 and 18 thereto or by first welding closure plates across the passages within the tubes. The closure plates may be rectangular plates 59 extending across the tubes, as shown in FIG. 3 or they may be arcuate plates 59' flush with the ends of the tubes, as shown in FIG. 4. The inlet and outlet joints 48, 50, 54 and 58 may be secured to the inner walls of the coiled tubes prior to the attachment of the end plates 16 and 18 to the cylinder.

At this point, it is mentioned that the welds or weld joints may be of various types, the invention herein involved not being concerned with the specific form of weld joint used. The representation of the weld joints on the drawing, therefore, is to be considered as illustrative of appropriate locations for welds, but not necessarily illustrative of the specific type of weld. It is, however, stressed that, regardless of the type of weld used, the same is chosen so as to provide a weld joint that is flush with the periphery with which it is associated so that the same may be preferably true throughout.

Figure 2:
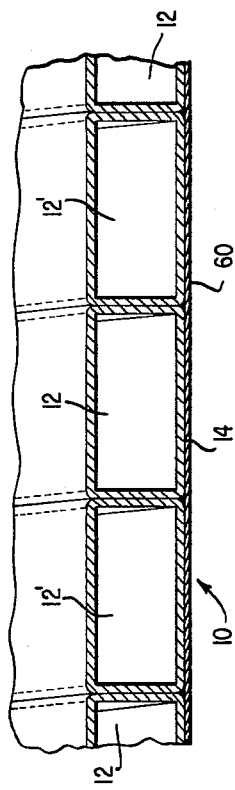
FIG. 2 is an enlarged fragmentary cross-sectional detail view of a portion of the roll as illustrated in FIG. 1.

The welds between the coiled tubes and between the tubes and the end plates are at least coextensive with the annular and helical joints thereof at the outer periphery of the cylinder so as to eliminate any crevices therebetween. Such welds should be at least flush with the outer peripheral surfaces of the coils and, if necessary, the outer surfaces and welds are machined to provide a true, smooth working surface 14. Depending upon the characteristics of the materials, the use for which the roll is intended, and/or the thickness of the outer peripheral wall, the wall may be provided, as shown in FIG. 2, with a coating 60 of one or more layers of metal, preferably noncorrosive, as by spray metalizing, plating or the like, after which it may be finished or ground as desired.

According to a modification of the invention, in lieu of the single tubes 12, 12', the tubing may comprise a multiple section extruded tube 12a having at least one integral partition 62 subdividing the interior thereof into independent sealed passages. Such a tube eliminates the necessity of the initial welding together of the two single tubes 12, 12'. Moreover, the tubing, whether single 12, 12' or multiple 12a, may be provided with one wall thicker than the other walls thereof, as illustrated in FIG. 3, and the tubing is coiled with the thicker wall forming the outer peripheral wall of the cylinder. The thicker outer wall will enable further finishing and increase structural strength, especially if the roll is to be subject to nip pressure with another roll when in operation.

The description hereinbefore refers to a pair of tube passages, but it will be understood that there may be a plurality of pairs of passages. As illustrated in FIG. 3, there may be two pairs of passages, one pair being provided by each tube 12a, there being two such tubes with the ends thereof each extending around substantially half the circumference of the roll.

In operation of the roll, a heat-exchange medium evidencing inherent fluid characteristics, such as water, steam or a refrigerant, is pumped through the annular inlet passage 38 to the headers 46 and 49 and then to the inlets 48 and 50, respectively, of the tubes 12 and 12'. The heat-exchange medium is then directed through the tube passages in helically disposed oppositely directed rotational paths and exits therefrom through the outlets 54 and 58 into the headers 52 and 56, the bore 36 and thence the outlet tube 30, the latter being connected to a suction apparatus (not shown), if desired, whereby the heat-exchange medium is discharged from the roll. This arrangement of the tube passages 12 and 12' offsets frictional drag on the body of the roll during rotation thereof.

Furthermore, the foregoing arrangement of the tube passages 12 and 12' has the advantage of dividing the incoming heat-exchange medium into a pair of equal streams, one of which flows in a helical path from one end of the body of the roll to the other, while the other stream flows in the opposite direction through an equal helical path extending side-by-side with the first helical path, the flow through these paths being in opposite rotational directions. A unit of area of the surface 14 across both helices adjacent one end of the roll, and a corresponding area adjacent the other end of the roll, has substantially the same average temperatures because each is exposed to the combined heat-exchange action of one stream of fresh heat-exchange medium entering one of the helical paths, and an equal stream of used medium exiting the other helical path. The average temperature near the middle of the roll is substantially the same as at the ends of the roll because both streams of heat-exchange medium at the middle of the roll have a temperature substantially equal to the average temperatures near the ends of the roll.

Thus, the present invention provides a roll having markedly improved heat-exchange properties for a number of reasons. There is the arrangement of the tube passages 12 and 12', or the two passages of the tube 12a, wherein the passages are completely sealed from each other. The tubes are of square or rectangular section and are in heat-exchange contact with one another whereby the temperature of the heat-exchange medium in one coil is modified by that of an adjacent coil by means of conduction through the wall thereof. Finally, all of the surfaces of the roll are perfectly true.

It is readily apparent, therefore, that a uniform heat-exchange apparatus is provided thereby subjecting a web of sheet material passing about the roll to a uniform degree or amount of heat. Moreover, since uniform heat exchange is attained, differential temperatures across the roll are substantially reduced whereby thermal stresses due thereto become substantially, if not completely, non-existent. It is of extreme significance, as pointed out above, that all of the surfaces of the roll, including the working periphery 14 thereof, are perfectly true. Thus, there are no disturbances upon and about the working periphery of the roll. The problem of leakage and therefore adequate sealing is substantially, if not completely, eliminated. The same is true with regard to the tube passages 12 and 12' since they are annularly continuous throughout their helical dimension.

The disclosed preferred embodiment of the present invention may be used as a drier roll when supplied with high temperature heat-exchange mediums, or as a cooling roll when supplied with low temperature heat-exchange mediums.

Although a certain specific embodiment of the present invention has been shown and described, it is obvious that many modifications thereof are possible. The invention, therefore, is not to be restricted except insofar as is necessitated by the prior art and by the spirit of the appended claims.

That which is claimed is:

1. A heat-exchange roll for treating webs of sheet material substantially uniformly across the width thereof, comprising a cylindrical roll body constituted by helically coiled tube means of rectangular cross section and providing at least a pair of helical passages therethrough, means on the ends of said roll body for rotatively supporting said body, the flat adjacent sides of the coils of said tube means being in heat exchange engagement substantially throughout their area, flush welds joining the outer peripheral edges of said coils and filling any crevices therebetween, the outer peripheral surfaces of said coils and said welds being finished to be true and function as the working surface of the roll, said passages being inclined in the same direction, means defining an inlet fluid passageway at one end of each helical passage and restricting fluid flow only into the respective passage with the inlet of the two passages being located in the roll body at relative opposite ends thereof, and means defining an outlet at the end of each helical passage opposite the respective inlet, whereby fluid is fed through one of the helical passages in one rotational direction and through the other of the helical passages in an opposite rotational direction to offset frictional drag on the roll body during rotation of the roll.

2. A rotatable heat-exchange roll for treating webs of sheet material substantially uniformly across the width thereof, comprising a cylindrical roll body constituted by helically coiled individual tubular members of rectangular cross section, said tubular members being disposed in adjoining heat exchange relation and having flat coplanar outer faces spaced slightly apart at their adjoining edges, said tubular members having an inlet portion disposed at opposite ends of the roll to receive a fluid circulating through the tubular members so that the temperature of all of the faces would be substantially uniform, flush welds joining said faces and being disposed in and completely filling the spaces between the faces, the outer faces and said welds being finished to be true and completely smooth.

3. The method of making a heat-exchange rotary roll, providing tube means of rectangular cross section and defining a pair of passages therethrough, helically coiling said tube means to form two helical passages in side by side relation with the helices interposed between each other and with the sides of the coils in engagement and with the tube means having inlet portions at opposite ends of the roll for the purpose of receiving a fluid circulating through the tube means, welding the outer engaged edges of the coils to securely connect the coils and completely fill any crevices therebetween, and finishing the outer walls of the coils and welds to form a true and smooth surface.

References Cited by the Examiner

UNITED STATES PATENTS

| | | | |
|---|---|---|---|
| 1,583,333 | 5/20 | Bigum | 165—91 |
| 1,965,553 | 7/34 | Lear | 165—140 X |
| 2,166,188 | 7/39 | Turner | 165—156 X |
| 2,500,684 | 3/50 | Johnson | 165—140 X |
| 2,621,903 | 12/52 | Cohler | 165—140 X |

FOREIGN PATENTS

| | | |
|---|---|---|
| 210,774 | 10/57 | Australia. |
| 591,141 | 1/60 | Canada. |
| 1,058,967 | 11/53 | France. |

CHARLES SUKALO, *Primary Examiner.*

FREDERICK L. MATTESON, JR., JAMES W. WESTHAVER, *Examiners.*